United States Patent [19]

Klein

[11] Patent Number: 5,018,758

[45] Date of Patent: * May 28, 1991

[54] HIGH EFFICIENCY BICYCLE FRAME

[76] Inventor: Gary G. Klein, 207-B S. Prairie Rd., Chehalis, Wash. 98532

[*] Notice: The portion of the term of this patent subsequent to Feb. 19, 2002 has been disclaimed.

[21] Appl. No.: 922,284

[22] Filed: Oct. 23, 1986

Related U.S. Application Data

[63] Continuation of Ser. No. 576,437, Feb. 2, 1984, Pat. No. 4,621,827, which is a continuation-in-part of Ser. No. 849,141, Nov. 7, 1977, Pat. No. 4,500,103, which is a continuation of Ser. No. 658,620, Feb. 17, 1976, abandoned.

[51] Int. Cl.⁵ .............................................. B62K 3/02
[52] U.S. Cl. ................................................. 280/281.1
[58] Field of Search ................... 280/281 R, 288, 274, 280/286, 281.1; 296/205

[56] References Cited

U.S. PATENT DOCUMENTS

| | | | |
|---|---|---|---|
| 452,649 | 5/1891 | Powell | 280/261 |
| 620,390 | 2/1899 | Wells | 280/261 |
| 626,875 | 6/1899 | Smith | 280/288 |
| 3,966,230 | 6/1976 | Nicol | 280/281 R |
| 4,500,103 | 2/1985 | Klein | 280/281 R |
| 4,621,827 | 11/1986 | Klein | 280/281 R |

FOREIGN PATENT DOCUMENTS

| | | | |
|---|---|---|---|
| 444604 | 3/1936 | United Kingdom | 280/281 R |
| 657011 | 9/1951 | United Kingdom | 280/281 R |

Primary Examiner—David M. Mitchell
Attorney, Agent, or Firm—Wolf, Greenfield & Sacks

[57] ABSTRACT

A bicycle frame which is made of large diameter tubing formed of an aluminum alloy and which is made very rigid to increase the power transmission efficiency and to improve the handling and riding characteristics. The result is a frame which is lighter, stronger, and much more rigid than prior art frames formed of steel tubing.

12 Claims, 1 Drawing Sheet

HIGH EFFICIENCY BICYCLE FRAME

CROSS REFERENCE TO RELATED APPLICATIONS

This application is a continuation of my application Ser. No. 576,437 filed Feb. 2, 1984, now U.S. Pat. No. 4,621,827, which is a continuation-in-part of my application Ser. No. 849,141, filed Nov. 7, 1977, now U.S. Pat. No. 4,500,103 for "HIGH EFFICIENCY BICYCLE FRAME", which was a continuation of my application Ser. No. 658,620, filed Feb. 17, 1976, now abandoned.

BACKGROUND AND BRIEF DESCRIPTION OF THE INVENTION

This invention relates generally to bicycle frames and more particularly, to the chainstay structure of bicycle frames.

In prior art frames, higher than normal rigidity achieved a harsh undesirable ride, while lower than normal rigidity caused significant power train deflection and energy loss. Prior art frames thus fell within a narrow rigidity range. This is a continuation or improvement upon the high efficiency bicycle frame as disclosed in the above referenced applications, which are incorporated herein by reference. In my above-identified applications, I disclose a high rigidity, light weight bicycle frame that exhibits improved ride, comfort and power efficiency. In subsequent testing, I have discovered that the bicycle's magnitude of deflection under pedaling load is substantially different depending on whether load is applied to the right or left hand pedal. I also discovered that material can be removed from the left chainstay and added to the right chainstay and the overall performance of the bicycle could be noticeably improved with no net addition of weight.

The objects of this invention are: First, improve the chainstay structure of bicycles and to increase the power train efficiency by reducing frame deflection losses. Second, to achieve good handling and comfortable ride characteristics in this more efficient frame. Third, to improve the mechanical strength of the frame. Fourth, to decrease the mass of the frame. Fifth, to improve the overall performance of a light weight bicycle with no net addition of weight. Sixth, to improve the fatigue durability of bicycle frames by increasing the durability of the highly stressed right hand chainstay.

BRIEF DESCRIPTION OF THE DRAWINGS

The above and other objects, advantages and features of the invention will become clear when considered with the following specification and accompanying drawings wherein:

Referring to the drawings, FIG. 1 shows a light weight bicycle frame F incorporating the invention. The frame including a head tube 10, top tube 12 secured (as by welding) at the forward end to head tube 10, a down tube 13 secured at its forward end to head tube 10, a seat tube 14 secured at its upper end to the trailing end of top tube 12, a bottom bracket shell 5 secured to the lower ends of the down tube 13 and seat tube 4, respectively, two chainstay tubes 20 and 21 secured at their forward ends to bottom bracket shell 5, two seatstay tubes 17L and 17R secured at their upper ends to seat tube 14 and at their lower ends to two rear fork ends or drop outs 18L and 18R, and a seatstay bridge 19 above the wheel (not shown). FIG. 2a shows tube cross sections secured between seatstay tubes 17L and 17R as disclosed in my above application having wall thickness T1R, T1L, both about 0.058 inch for small frames and about 0.102 inch for large frames and exterior diameters D1R, D1L, about 1 inch for all sizes.

FIG. 3 shows the chainstay assembly where the improvement in the present invention resides.

The various parts of the frame F are attached in a suitable manner so as not to lose strength or rigidity at the joints J. The preferred configuration utilizes welded or brazed joints with subsequent heat treatment where applicable but lugs or other joining devices or means can be applied.

The frame F is a critical member of the bicycle power train. When reciprocating pedaling force is applied to bicycle part of it is wasted in deflecting the frame. Bicycles behave like linear springs when deflected. As the frame is distorted energy is stored in it. The amount of energy stored is proportional to the deflection squared. If the frame is resisted as it returns to an unloaded condition work is done on the resisting force, i.e., the rider's legs. If the return is not resisted, and the frame is allowed to spring back freely, the work is lost as heat. Unfortunately, muscles can not reabsorb energy, so work put into the rider's legs is also lost as heat.

Figure 1:
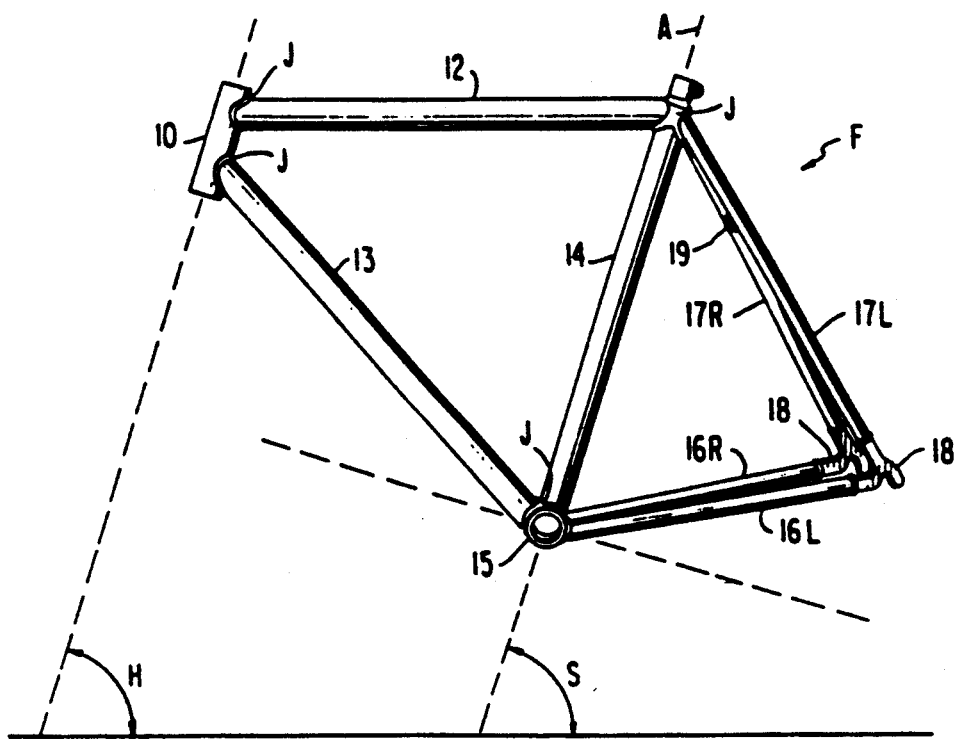
FIG. 1 is a side isometric view of a bicycle incorporating the invention.

The two main types of frame deflection are: First, twisting of the frame between the head tube 10 and the bottom bracket shell 15 around an axis A as in FIG. 1 causes by the torque exerted through the handlebars (not shown) and cranks CR and CL (FIG. 3) during hard pedaling. Second, side (lateral) deflection of the bottom bracket shell 15 out of the main plane of the frame caused by the off center force applied during hard pedaling.

In general, it is relatively easy to twist a light tube, more difficult to bend it and very difficult to stretch or compress it. In my patent, as in standard bicycle frames, most attention is devoted to the forces exerted by the bicyclist and the ground. In that patent, very large diameter frame tubing is used to resist the relatively large torsional and bending forces. The compressive properties of the seatstays are also examined for their suspension properties. In use, this approach has proven to be very effective and accurate. However, subsequent testing has revealed a new area to look at. The chain side chainstay, although a rather beefy piece of tubing, with a high degree of compressive rigidity and strength, is nevertheless an important member to look at in the compressive mode. The force exerted by the cyclist on the pedals is multiplied by leverage in the driving chain. Strong racers have been known to snap normal bicycle chains, which have a tensile strength of close to 2,000 pounds$_{force}$. This chain tension primarily results in a compressive force in the chain side chainstay. Because of this large amount of compressive force on the one chainstay, the deflection in compressive mode is significant.

In the earlier patent application, it was stated that "there is little movement of the bottom bracket shell 15 toward or away from the rear cog" and "the bottom bracket shell 15 rigidly resists movement toward or away from the rear cog in the plane of the chainstay tubes". These statements were made considering the forces which a rider applies, but did not consider or take into account the large chain force. The present invention takes into account the large chain force by increasing the rigidity of the chainstay tube by thickening the wall thickness of that tube and to maintain the weight the same, metal is removed from the non-chain side chainstay by reducing the wall thickness on that side approximately proportionate in amount in terms of weight, e.g., the weight added to the chain side tube is removed from the non-chain side tube.

The relative amounts which each of the two types of deflection lateral bending rigidity and bottom bracket torsion rigidity contribute to the total power train deflection varies with frame geometry and also depends on how the rider applies force. Some bicycle racers lean the bicycle into the powering leg as much as fifteen degrees in sprinting of hill climbing. This increases the importance of lateral bending stiffness. Some bicycle racers will not lean the bicycle as severely. As a result, a total rigidity of the power train can not be objectively calculated. However, given the two stiffness data, frame geometry and bike lean a total rigidity of the power train can be objectively calculated. On the average the lateral bending deflection accounts for approximately 60 percent of the total power train deflection due to the frame. The torsional deflection accounts for the remainder.

Steel racing type bicycle frames have Bottom Torsion Test deflections between 0.072 inches and 0.095 inches and Lateral Bending Stiffness Test deflections between 0.026 inches and 0.04 inches. This results in a bottom bracket torsion rigidity of between 42 and 53 pounds$_{force}$ feet per degree and lateral bending rigidity of between 62 an 75 pounds$_{force}$ per inch. Racing type bicycle frames constructed of more exotic material such as titanium, carbon fiber composites of aluminum alloy have had Bottom Bracket Torsion Test deflection between 0.089 inches and 0.122 inches and Lateral Bending Stiffness Test deflections between 0.04 inches and 0.049 inches resulting in a bottom bracket torsion rigidity of between 33 and 45 pounds$_{force}$ feet per degree and lateral bending rigidity of between 61 and 75 pounds$_{force}$ per inch. The exotic type material bicycle frames have not enjoyed much competition use as they do not have sufficient power train rigidity.

The two main types of power train deflection are mostly the result of torsional and bending movements of the individual frame tubes. Accordingly, the torsional and bending rigidity of each frame tube has been increased where appropriate to increase the power train rigidity.

The top tube has bending force applied to it both when the bottom bracket twists and when the frame bends laterally so the tube diameter and wall thickness of the tubing are selected to increase the bending rigidity. The down tube has both bending and torsion forces applied to it both when the bottom bracket twists and when the frame bends laterally so the diameter and wall thickness of the tubing is selected to increase the bending rigidity. As disclosed in my above applications, the chainstay tubes have torsional force applied to them when the bottom bracket twists and bending force applied to them when the frame bends laterally so the diameter and wall thickness of the tubing is selected to increase the torsional and bending rigidity. According to this invention, however, the metal is added to the chain or drive side of tube 16R by thickening the tube wall or increasing the diameter, or both and a corresponding amount of metal is removed from the non-chain or nondrive side tube 16L. The seatstay tubes have bending force applied to them when the frame bends laterally so increased bending rigidity is provided by increased diameter seatstay tubes with wall thickness from about 0.035 inch for small frames to about 0.049 inch for large frames. Table I (below) sets out preferred tubing diameters and wall thickness for a small size frame (46 cm) and a large size frame (70 cm). Table II sets out the typical frame specifications for racing type frames and touring type frames.

TABLE I

Typical Tube Diameters And Wall Thickness
46 cm (small frame)  70 cm (large frame)
HEAD TUBE 1.42" OD, ID 1.180" (about 1" each end),
.065" wall thickness for center section

|  | OD | THICKNESS | OD | THICKNESS |
|---|---|---|---|---|
| TOP TUBE | 1.50" | .035" | 1⅝" | .049" |
| DOWN TUBE | 1⅝" | .049" | 1¾" | .065" |
| SEAT TUBE | 1.25" | .083" | 1.25" | .083" |
| SEATSTAY | ⅞" | .035" | ⅞" | .049" |
| CHAINSTAY | D3 D4 T3 T4 | | D3 D4 T3 T4 | |
|  | 1" 1" .065" .049" | | 1" 1" .12" .083" | |

BOTTOM BRACKET 1⅝" .12" wall thickness

In about the mid-size range of frames, for example, a 62 cm frame $T_3$ is about 0.065 inch and $T_4$ is about 0.095 inch.

TABLE II

TYPICAL FRAME SPECIFICATIONS

*General Purpose Road Racing And Light Touring*

| | | | | | | | | | | | |
|---|---|---|---|---|---|---|---|---|---|---|---|
| Frame Size (cm) | | | 51 | | 54 | | 57 | 59 | 61 | 64 | |
| (Inches) | | | 20.1" | | 21.3" | | 22.4" | 23.2" | 24.0" | 25.2" | |
| Top Tube Height From Ground (Inches) | | | 29.7 | | 31.0 | | 32.3 | 33.2 | 33.9 | 35.1 | |
| Typical Rider Height | | | 5'4" | | 5'7" | | 5'10" | 6'0" | 6 2" | 6'5" | |
| Typical Crank Length (mm) | | | 165 | | 170 | | 172.5 | 175 | 177.5 | 180 | |
| Top Tube Length (cm) | | | 52.8 | | 54.4 | | 55.9 | 56.9 | 57.7 | 59.2 | |
| Head Angle | | | 72.3° | | 73° | | 73.6° | 74° | 74.2° | 74.4° | |
| Fork Rake (Inches) | | | 1.5 | | 1.5 | | 1.5 | 1.5 | 1.5 | 1.5 | |
| Seat Angle | | | 72.5° | | 72.5° | | 72.5° | 72.5° | 72.5° | 72.5° | |
| Bottom Bracket Height (Inches) | | | 10.6 | | 10.7 | | 10.9 | 11.0 | 11.0 | 11.1 | |
| Chainstay Length (Inches) | | | 16.3 | | 16.3 | | 16.3 | 16.3 | 16.3 | 16.3 | |
| Wheel Base (Inches) | | | 37.4 | | 37.9 | | 38.3 | 38.6 | 38.8 | 39.1 | |

*Longer Road Races and all Types of Touring*

| | | | | | | | | | | | | |
|---|---|---|---|---|---|---|---|---|---|---|---|---|
| Frame Size (cm) | 46 | 48 | 50 | 52 | 54 | 56 | 58 | 60 | 62 | 64 | 66 | 68 | 70 |
| (Inches) | 18.1" | 18.9" | 19.7" | 20.5" | 21.3" | 22.1" | 22.8" | 23.6" | 24.4" | 25.2" | 26.0" | 26.8" | 27.6" |

TABLE II-continued

TYPICAL FRAME SPECIFICATIONS

| | | | | | | | | | | | | | |
|---|---|---|---|---|---|---|---|---|---|---|---|---|---|
| Top Tube Height From Ground (Inches) | 27.0 | 28.0 | 29.0 | 30.1 | 31.0 | 31.8 | 32.7 | 33.6 | 34.4 | 35.2 | 36.1 | 36.8 | 37.0 |
| Typical Rider Height | 4'11" | 5'1" | 5'3" | 5'5" | 5'7" | 5'9" | 5'11" | 6'1" | 6'3" | 6'5" | 6'7" | 6'9" | 6'11" |
| Typical Crank Length (mm) | 150 | 155 | 160 | 165 | 167.5 | 170 | 172.5 | 175 | 177.5 | 180 | 180 | 180 | 180 |
| Top Tube Length (cm) | 51.2 | 52.2 | 53.2 | 54.2 | 55.2 | 56.2 | 57.2 | 58.2 | 59.2 | 60.2 | 61.2 | 62.2 | 63.2 |
| Head Angle | 72° | 72° | 72° | 72° | 72° | 72.5° | 72.5° | 72.5° | 72.5° | 72.5° | 72.5° | 72.5° | 72.5° |
| Fork Rake (Inches) | 1.5 | 1.5 | 1.5 | 1.75 | 1.75 | 1.5 | 1.5 | 1.5 | 1.5 | 1.5 | 1.5 | 1.5 | 1.5 |
| Seat Angle | 74° | 74° | 74° | 74° | 74° | 74° | 74° | 74° | 74° | 74° | 74.5° | 74.5° | 74.5° |
| Bottom Bracket Height (Inches) | 9.6 | 9.8 | 10.0 | 10.2 | 10.3 | 10.4 | 10.5 | 10.6 | 10.7 | 10.8 | 10.8 | 10.8 | 10.8 |
| Chainstay Length (Inches) | 16.5 | 16.5 | 16.5 | 18 | 18 | 18 | 18 | 18 | 18 | 18 | 18 | 18 | 18 |
| Wheel Base (Inches) | 38.2 | 38.7 | 39.2 | 40.7 | 41.1 | 41.2 | 41.6 | 42.2 | 42.6 | 43.0 | 43.6 | 44.1 | 44.5 |

Thus, the improvement according to the present invention with the top, down, seat, chainstay, and seatstay tubes having the diameter wall-thickness ratios of less than 50 and the preferred diameter and wall-thickness of the frame tubing as given hereinabove, has a lateral bending rigidity of at least 120 pound$_{force}$ per inch and a bottom bracket torsion rigidity of at least 67 pound$_{force}$ per degree. This high degree of stiffness coacting with the light weight produces a bicycle frame which has surprisingly high power train efficiency, good handling and riding characteristics heretofore unachievable in light weight bicycle frames of the character herein disclosed.

The riding comfort or "ride" of a frame is influenced by many factors. Among these are frame weight, frame geometry and the frame rigidity in suspension modes.

Light mass is desirable in a bicycle. A light bicycle requires relatively low energy to accelerate and maneuver. It makes hills easier to climb. Also, a large portion of the suspension of the total mass of the bicycle and rider occurs in the rider's arms, legs and seat. These are particularly effective as low frequency, large movement suspension members. Thus, light bicycle mass effectively increases the traction and road holding ability of the bicycle. The relative weight a typical frame tube can be described by $M \times (D^2 - (D - 2T)^2$ which is designated as WT (M = density). The preferred configuration results in a frame weight saving of 25 percent over the best prior (best prior art defined as prior art which is generally accepted as best).

The frame geometry is constrained by three factors: First, the rider must be in a low wind resistance high power output position. Second, the handling characteristics are influenced by the frame geometry and must be designed for. Third, the components of the bicycle must be correctly aligned to fit and function properly. Within these constraints frame geometries can be designed which will exhibit small but important differences in handling and "ride". The preferred configuration results in the angle H between the head tube 10 and the ground surface ranging between 73 and 75 degrees and the angle 5 between the seat tube 14 and the ground surface ranging between 73 and 74 degrees. See Table II above for specific angles. The ground surface is positioned as it will be when appropriate wheels and front fork (not shown) are installed.

The main suspension modes of the frame result in tension, compression and bending of the frame tubes. The most important suspension members are the seat stay tubes. The relative stiffness of a frame tube along its axis can be described by $E_r \times (D - 2T)^2$ which is designated as SRT. The preferred configuration of seatstay tube utilizes diameter and wall thickness of an aluminum alloy tubing to decreases the suspension mode stiffness about one-third resulting in a smoother ride.

The combined effect of the described factors produce a bicycle frame which achieves both high power train rigidity and good handling and riding characteristics.

Bicycle frames must be of sufficient strength to endure the high stresses placed upon them. Prior art racing type bicycle frames when they do fail usually fail by causing the frame tubes to bend. The relative yield strength of a typical frame tube in bending can be described by $T_y \times (D^3 - (T - 2D)^3$ which is designated as YST. This type of failure is usually the result of a crash or collision which unfortunately are not rare occurrences, especially in competition conditions. The most common failures occur in the top tube and the down tube. The preferred configuration increases the yield strength of the frame.

Less frequent, but significant are fatigue failures. Here too, the most critical is the bending strength, particularly in the down tube 13. The relative fatigue strength of a typical frame tube in bending can be described by $T_f \times (D^3 - (D - 2T)^3$ which is designated as FST. The preferred configuration increases the fatigue strength of the frame.

The invention is a product of two separate developments. The first was the ability to create higher rigidity and strength in a frame while reducing the weight. In steel frames, the tubes are so made as to have larger wall thicknesses at the brazed joints to reinforce the portions of the tube which lose part of their temper during brazing.

The preferred configuration uses an aluminum alloy such as 6061 T6. It has properties such as Modulus of Elasticity $E_t$ of 10,000,000 psi, a Modulus of Rigidity $E_s$ of 3,800,000 psi, a density of D of 0.098 pounds$_{force}$ per cubic inch, a tensile yield strength of 40,000 psi, and a tensile fatigue strength of 14,000 psi. By heat treating the frames after welding, essentially full strength is restored. At a casual glance it is lighter, but it is not as stiff or as strong as steel. The higher rigidity of the invention comes from the special configuration of tubing chosen in conjunction with the natural properties. However, as noted above, the invention is not limited to heat treating of welded frames, since some light weight alloys can be welded to without significant loss of strength and with lugged frames, welding is not needed.

The preferred configuration, as set forth in the U.S. Pat. No. 4,500,103 includes a top tube having an outer diameter of 1.5 inches and a wall thickness of 0.051 inch, a down tube having an outer diameter of 1.5 inches and wall thickness of 0.059 inch, a chainstay having an outer diameter of 0.84 inch and a wall thickness of 0.109 inch and a seatstay having an outer diameter of 0.75 inch and a wall thickness of 0.035 inch. The relative axial rigidity for each of the tubes of the preferred configuration can be determined from the stiffness formula provided above, designated SRT, in the present application (also see column 6, line 29 of U.S. Pat. No. 4,500,103), using the modulus of elasticity provided hereinabove for the 6061 T6 aluminum alloy. As a result of this calculation, the relative axial rigidity of the chainstay of the preferred configuration is 2,503,189.6 pounds$_{force}$, while the axial rigidity of the seatstay of the preferred configuration is 786,183.56 pounds$_{force}$. The relative bending yield strength for each of the tubes of the preferred configuration can be determined from the formula provided above, designated YST (also see column 6, line 42 of U.S. Pat. No. 4,500,103) using the tensile yield strength for the 6061 T6 aluminum alloy set forth hereinabove. As a result of these calculations, the relative bending yield strength for the top tube is 25,709.728 pounds$_{force}$ inches, for the downtube is 29,419.4 pounds$_{force}$ inches, for the chainstay tube is 14,082.486 pounds$_{force}$ inches, and for the seatstay is 4297.72 pounds$_{force}$ inches. The relative bending rigidity for each of the tubes of the preferred configuration can be determined from the formula set forth in U.S. Pat. No. 4,500,103 at column 5, lines 52 and 53, using the value for the modules of elasticity for the 6061 T6 alloy set forth hereinabove. As a result of these calculations, the relative bending rigidity for the top tube is 12,428,050 pounds$_{force}$ inches squared, for the down tube is 14,146,903 pounds$_{force}$ inches squared, for the chainstay is 3,481,921.3 pounds$_{force}$ squared and for the seatstay is 1,025,924.9 pounds$_{force}$ inches squared. The relative torsional rigidity for each of the tubes of the preferred configuration can be determined from the formula provided in U.S. Pat. No. 4,500,103 at column 5, lines 53-55, using the value for the modulus of rigidity for the 6061 T6 alloy set forth hereinabove. The relative torsional rigidity for the down tube as calculated in 5,375,823.2 pounds$_{force}$ inches squared. The relative bending fatigue strength of each of the tubes for the preferred configuration can be calculated from the formula set forth on above, designated FST (also see column 6, line 53 of U.S. Pat. No. 4,500,103), using the tensile fatigue strength for the 6061 T6 alloy set forth hereinabove. As a result of these calculations the relative bending fatigue strength of the top tube is 8998.40 pounds$_{force}$ inches, the downtube is 10,296.79 pounds$_{force}$ inches and the chainstay tube is 4928.87 1 pounds$_{force}$ inches.

While it might seem that the same results could be achieved by using larger diameters with thinner walls in steel, it is not practical to use tubing with a diameter/wall thickness of over 50. At this point tubes become prone to crippling failure and the strengths described above no longer apply. The lighter gauges of steel down tubes are already near this engineering ratio, in fact, some are slightly in excess of it. Thus, there is a limit to how far the diameter of the tube can be increased with a given material within a given weight.

The preferred configuration uses aluminum alloy because it is less dense than steel and can be utilized in larger diameters without an increase in weight and remain within the diameter/wall thickness engineering limit. It also has the advantages of low cost, availability, established welding techniques, corrosion resistance, good machineability, and it is not brittle. However, the invention is not limited to aluminum alloy but could be constructed of other materials such as beryllium alloys, titanium alloys, magnesium alloys, or composites of other materials including such materials as glass fibers, carbon fibers, high strength plastic fibers, boron fibers, aluminum oxide fibers, or silicon carbide fibers.

Boron fiber reinforcements have been used heretofore on chainstays, seatstays, and fork blades. They serve two important functions. First, the fiber pattern is oriented to stiffen these tubes against lateral deflection. This is most beneficial on the stays and fork blades where lateral stiffness is critical (typically weak points in overall frame side to side stiffness). The second advantage is that boron composites absorb high frequency shock many times better than conventional structural materials. Consequently, it effectively helps the forks and stays dampen road shock for an exceptionally smooth ride and thus, boron reinforced aluminum tubing can be used to advantage in the present invention.

The second development has the realization of desirable "ride" and handling properties with a very stiff power train. Previously, power train rigidity had been equated with harsh ride. In Top Tubes By Reynolds Tube Co., Ltd. of Birmingham, England, they write "If your frame is too rigid, it will transmit every vibration, every bump, from the road into your poor aching body; it will fight you on every bend of the way; it will drag you back on every hill." The invention, through a combination of light frame weight, improved suspension characteristics, and increased power train rigidity has achieved a combination of "ride", handling and power train efficiency that is a breakthrough in frame design.

Figure 3:
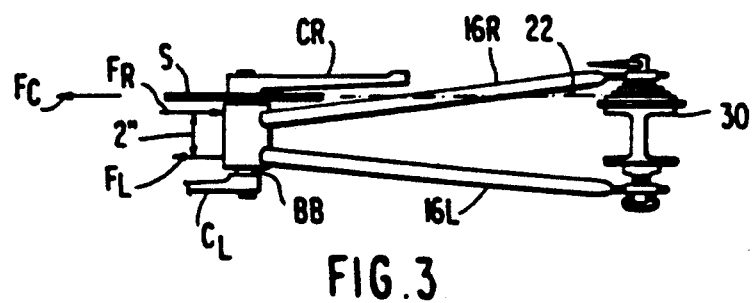
FIG. 3 is a top plan view of the chainstays and drive assembly (front sprocket and pedal cranks, chain and rear derailleures) incorporating the invention.

As shown in FIG. 3, the chainstay assembly per se includes bottom bracket shell 15, right chainstay tube 20, a left chainstay tube 21, a chain 22, left and right bicycle cranks CR and CL and bottom bracket assembly BB in bottom bracket shell 15. A force vector Fc represents the chain tension, force vector FR represents the right side chainstay compression and force vector F represents the left chainstay tension.

Figure 2A:
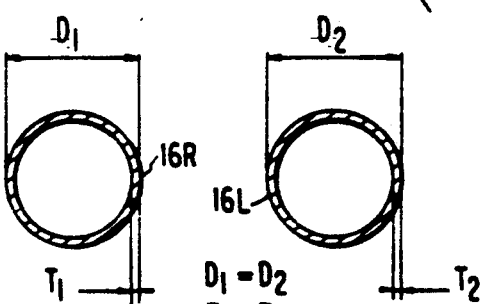
FIG. 2a is a sectional view of a chainstay tube pair dimension as disclosed in my above-identified applications.
Figure 2B:
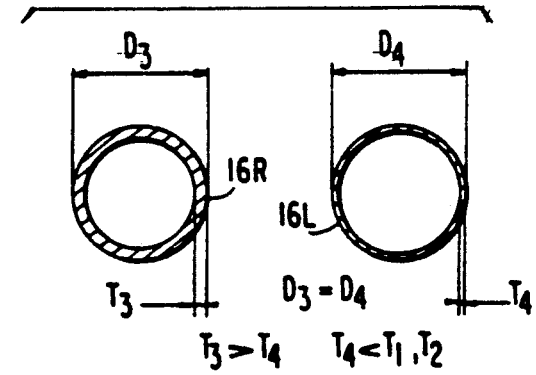
FIG. 2b is a sectional view of the chainstay tube pair incorporating the invention.

As shown in FIG. 2a, a conventional bicycle frame, the left chainstay 16L and the right chainstay 16R are of equal diameter B and wall thickness T and have equal axial rigidity and weight, although the right chainstay may have additional dents or crimps in it in order to clear the bicycle sprocket S, crank CR, and/or tire. If this is the case, the only effect is that the axial rigidity may be slightly lower than otherwise expected. The drive chain 22 is also typically on the right hand side as shown and will be presumed to be the chain or drive side for illustration purposes. The invention would also apply to a left hand drive bicycle. Chain 22 may be controlled on rear drive sprocket and hub assembly 30 by a derailleur (not shown).

My above referenced applications utilize large diameter light weight tubing to increase overall frame bending and torsion rigidity, increase frame strength, reduce frame weight and reduce the axial rigidity of at least some of the tubes, in order to improve the ride comfort. However, I have found that by increasing the rigidity of the right hand (chain or "drive" side) chainstay, at the expense of the left hand (or nondrive side) chainstay, the total amount of frame deflection due to applied pedal loads can be significantly reduced with no loss of other beneficial aspects of this frame design. The overall light weight, comfortable ride, frame strength and power train rigidity are either unimpaired or improved. Specifically, the frame strength and power efficiency are improved.

Referring to FIG. 3, for a peak chain tension of 800 pounds force, the balancing tension in the left chainstay 16L is 400 pounds force, and the compressive load in the right chainstay 16R is 1200 pounds force. The total angular deflection of the bottom bracket shell 15 will be the sum of the axial deflections of both chainstays. Let the total amount of material in both chainstays equal 100. This will also be the case for their effective rigidities. In a standard bicycle, each chainstay would have a spring constant of 50. So the total deflection will be 1200/50 plus 400/50 for 32 total deflection. If each chainstay is made proportionately rigid to the applied load, the right chainstay will have a spring constant of 75 and the left chainstay will have a spring constant of 25. In this case the total deflection will be 1200/75 plus 400/25 for 32 total deflection. There is no improvement. Neither of these cases are optimal. If the right chainstay is made with a spring constant of 63 and the left is 37, the total deflection will be 1200/63 plus 400/37 lfor 29.86 total deflection. This represents a 7.2 percent increase in power train rigidity with no weight penalty. The preferred configuration uses a right hand (chain side) chainstay with about a 50 percent heavier wall thickness and a resulting 50 percent larger axial rigidity than the left chainstay. Even a small difference in the two chainstays will improve the bicycle frame somewhat. As an example, an 8.3 percent difference in right and left chainstays will result from a right chainstay of 52 rigidity, and a left of 48. The total deflection will be 1200/52 plus 400/48 for 31.41 total deflection. This is a 1.9 percent improvement over the standard bicycle. This is significant for only an 8.3 percent difference in the chainstays. Again, this improvement is achieved with no net increase in weight.

In the preferred configuration of U.S. Pat. No. 4,500,103, in which the chainstays have a diameter of 0.84 inch and a wall thickness of 0.109 inch, the axial rigidity of the chainstays, as previously calculated is 2,503,189.6 pounds$_{force}$. Assuming that the preferred configuration is used for the non-chainside chainstay, the chainside chainstay would have an axial rigidity of at least about 10 percent greater than the non-chainside chainstay, or at least about 2,753,508.5 pounds$_{force}$.

Obviously, the right hand chainstay, on account of the chain loading, is under greater stress than the left chainstay. A slightly stronger right chainstay with a slightly reduced left chainstay will improve the overall durability of the bicycle by evening out the stress levels in the frame material. In other words, the very high stress levels in the right chainstay can be reduced with only a small increase in the low stress level present in the left chainstay. This should act to increase the fatigue durability of the bicycle frame, by increasing the durability of the highly stressed right hand chainstay.

In general, a 7 percent improvement is pretty good considering the state of evolution of the bicycle frame. This is not 7 percent improvement in the entire frame, but 7 percent in the area of the chainstay assembly. Also, the straight tension and compression forces used in the present case are probably a simplification of the actual bike. Those chainstays are also in bending and torsion, not just tension and compression. The generalization given above also ignores that the stays are spread at an angle, so the force vectors are not quite right. However, this discussion captures the heart of the problem, however, with the simplified analysis. Also, the chainstay compression force is rarely, if at all mentioned in the literature.

The invention further comprises the balance of the bicycle (not shown) which is of conventional form and which comprises a fork, head set, wheels, pedals, pedal cranks connecting the pedals to the crank axle, handlebars, and drive chain drivingly connected between the crank axle and rear wheel, all of conventional form (also not shown).

It will now be apparent to those skilled in the art that other variations may be made within the scope of the invention. It is therefore intended that the above disclosure shall read as illustrative.

What is claimed:

1. In a bicycle having one wheel of greater than 25 inches in diameter and a frame of the type including a tubular top tube having front and rear ends, a tubular seat tube having top and bottom ends, a tubular head tube, a tubular down tube having top and bottom ends, a pair of chainstay tubes having front and rear ends, two seatstay tubes having top and bottom ends, a bottom bracket and two rear fork ends, wherein said top end of said down tube, said head tube and said front end of said top tube are interconnected, said top ends of both said seatstay tubes, said top end of said seat tube and said rear end of said top tube are interconnected, said bottom bracket, said bottom end of said down tube and said bottom end of said seat tube and said front ends of both said chainstay tubes are interconnected, said two rear fork ends, said rear ends of both said chainstay tubes and said bottom ends of both said seatstay tubes are interconnected, wherein said head tube is at a ground angle of between 60° to 80°, and said seat tube is at a ground angle of between 58° and 85° when the appropriate front fork and wheels are attached and rest on the ground, and wherein the mass of the frame without fork or other equipment is less than 5 pounds, the improvement wherein each of said top tube, down tube, seat tube, chainstay tubes and seatstay tubes is of a diameter and wall thickness such that said frame has a torsional rigidity between said head tube and said bottom bracket of at least 67 pounds$_{force}$ feet per degree of deflection with a torque being applied to said bottom bracket along an axis normal to the axis of said seat tube and normal to the axis of said bottom bracket with said head tube being clamped immovably, and a lateral bending rigidity of at least 120 pounds$_{force}$ per inch of deflection measured at said rear fork ends of said bicycle frame with an axle installed, with said head tube clamped immovably in a horizontal position and with said bottom bracket supported but not otherwise restrained, a force being applied and deflection measured in a direction normal to the plane of the bicycle frame and along the axis of the rear axle, and wherein said chainstay tubes each have a relative bending rigidity represented as the outer diameter to the fourth power minus the inner diameter to the fourth power all times the modulus of elasticity of the tube material of at least about 3,481,921.3 pounds$_{force}$ inches squared.

2. A bicycle frame as defined in claim 1 further comprising driving device means comprising a crank set and a front sprocket carried by said bottom bracket, a rear drive sprocket and hub assembly carried by said two rear fork ends, and a driving chain disposed on one side of said frame and trained over said front sprocket and said rear drive sprocket, said chainstay tube on said one side of said bicycle frame having at least 10 percent more axial rigidity than said chainstay tube disposed on the other side of said bicycle frame.

3. In a bicycle having one wheel of greater than 25 inches in diameter and a frame of the type including a tubular top tube having front and rear ends, a tubular seat tube having top and bottom ends, a tubular head tube, a tubular down tube having top and bottom ends, a pair of chainstay tubes having front and rear ends, two seatstay tubes having top and bottom ends, a bottom bracket and two rear fork ends, wherein said top end of said down tube, said head tube and said front end of said top tube are interconnected, said top ends of both said seatstay tubes, said top end of said seat tube and said rear end of said top tube are interconnected, said bottom bracket, said bottom end of said down tube and said bottom end of said seat tube and said front ends of both said chainstay tubes are interconnected, said two rear fork ends, said rear ends of both said chainstay tubes and said bottom ends of said seatstay tubes are interconnected, wherein said head tube is at a ground angle of between 60° to 80°, and said seat tube is at a ground angle of between 58° and 85° when the appropriate front fork and wheels are attached and rest on the ground, and wherein the mass of the frame without fork or other equipment is less than 5 pounds, the improvement wherein each of said top tube, down tube, seat tube, chainstay tubes and seatstay tubes is of a diameter and wall thickness such that said frame has a torsional rigidity between said head tube and said bottom bracket of at least 67 pounds$_{force}$ feet per degree of deflection with a torque being applied to said bottom bracket along an axis normal to the axis of said seat tube and normal to the axis of said bottom bracket with said head tube clamped immovably, and wherein said down tube has a relative bending fatigue strength represented as the outer diameter cubed minus inner diameter cubed all times the fatigue strength of the tube material of at least about 10,296.79 pounds$_{force}$ inches.

4. In a bicycle having one wheel of greater than 25 inches in diameter and a frame of the type including a tubular top tube having front and rear ends, a tubular seat tube having top and bottom ends, a tubular head tube, a tubular down tube having top and bottom ends, a pair of chainstay tubes having front and rear ends, two seatstay tubes having top and bottom ends, a bottom bracket and two rear fork ends, wherein said top end of said down tube, said head tube and said front end of said top tube are interconnected, said top ends of both said seatstay tubes, said top end of said seat tube and said rear end of said top tube are interconnected, said bottom bracket, said bottom end of said down tube and said bottom end of said seat tube and said front ends of both said chainstay tubes are interconnected, said two rear fork ends, said rear ends of both said chainstay tubes and said bottom ends of said seat stay tubes are interconnected, wherein said head tube is at a ground angle of between 60° to 80° and said seat tube is at a ground angle of between 58° and 85° when the appropriate front fork and wheels are attached and rest on the ground, and wherein the mass of the frame without fork or other equipment is less than 5 pounds, the improvement wherein each of said top tube, down tube, seat tube, chainstay tubes and seatstay tubes is of a diameter and wall thickness such that said frame has a torsional rigidity between said head tube and said bottom bracket of at least 67 pounds$_{force}$ feet per degree of deflection with a torque being applied to the bottom bracket along an axis normal to the axis of said seat tube and normal to the axis of said bottom bracket with said head tube clamped immovably, and wherein said down tube has a relative bending yield strength represented as the outer diameter cubed minus the inner diameter cubed all times the yield strength of the tube material of at least about 29,419.4 pounds$_{force}$ inches.

5. In a bicycle having one wheel of greater than 25 inches in diameter and a frame of the type including a tubular top tube having front and rear ends, a tubular seat tube having top and bottom ends, a tubular head tube, a tubular down tube having top and bottom ends, a pair of chainstay tubes having front and rear ends, two seatstay tubes having top and bottom ends, a bottom bracket and two rear fork ends, wherein said top end of said down tube, said head tube and said front end of said top tube are interconnected, said top ends of both said seatstay tubes, said top end of said seat tube and said rear end of said top tube are interconnected, said bottom bracket, said bottom end of said down tube and said bottom end of said seat tube and said front ends of both said chainstay tubes are interconnected, said two rear fork ends, said rear ends of both said chainstay tubes and said bottom ends of said seat stay tubes are interconnected, wherein said head tube is at a ground angle of between 60° to 80° and said seat tube is at a ground angle of between 58° and 85° when the appropriate front fork and wheels are attached and rest on the ground, and wherein the mass of the frame without fork or other equipment is less than 5 pounds, the improvement wherein each of said top tube, down tube, seat tube, chainstay tubes and seatstay tubes is of a diameter and wall thickness such that said frame has a lateral bending rigidity of at least 120 pounds$_{force}$ per inch of deflection measured at said rear fork ends of said bicycle frame with an axle installed, with said head tube clamped immovably in a horizontal position and with said bottom brackets supported but not otherwise restrained, a force being applied and deflection measured in a direction normal to the plane of the bicycle frame and along the axis of the rear axle, and wherein said down tube has a relative bending fatigue strength represented as the outer diameter cubed minus the inner diameter cubed all times the fatigue strength of the tube material of at least about 10,296.79 pounds$_{force}$ inches.

6. In a bicycle having one wheel of greater than 25 inches in diameter and a frame of the type including a tubular top tube having front and rear ends, a tubular seat tube having top and bottom ends, a tubular head tube, a tubular down tube having top and bottom ends, a pair of chainstay tubes having front and rear ends, two seatstay tubes having top and bottom ends, a bottom bracket and two rear fork ends, wherein said top end of said down tube, said head tube and said front end of said top tube are interconnected, said top ends of both said seatstay tubes, said top end of said seat tube and said rear end of said top tube are interconnected, said bottom bracket, said bottom end of said down tube and said bottom end of said seat tube and said front ends of both said chainstay tubes are interconnected, and said two rear fork ends, said rear ends of both said chainstay tubes and said bottom ends of said seatstay tubes are interconnected, wherein said head tube is at a ground angle of between 60° to 80° and said seat tube is at a ground angle of between 58° and 85° when the appropriate front fork and wheels are attached and rest on the ground, and wherein the mass of the frame without fork or other equipment is less than 5 pounds, the improvement wherein each of said top tube, down tube, seat tube, chainstay tubes and seatstay tubes is of a diameter and wall thickness such that said frame has a torsional rigidity between said head tube and said bottom bracket of at least 67 pounds$_{force}$ feet per degree of deflection with a torque being applied to the bottom bracket along an axis normal to the axis of said seat tube and normal to the axis of said bottom bracket with said head tube clamped immovably, and wherein at least one of said chainstay tubes has a relative bending fatigue strength represented as the outer diameter cubed minus the inner diameter cubed all times the fatigue strength of the tube material of at least about 4,928.87 pound$_{force}$ inches.

7. In a bicycle having one wheel of greater than 25 inches in diameter and a frame of the type including a tubular top tube having front and rear ends, a tubular seat tube having top and bottom ends, a tubular head tube, a tubular down tube having top and bottom ends, a pair of chainstay tubes having front and rear ends, two seatstay tubes having top and bottom ends, a bottom bracket and two rear fork ends, wherein said top end of said down tube, said head tube and said front end of said top tube are interconnected, said top ends of both said seatstay tubes, said top end of said seat tube and said rear end of said top tube are interconnected, said bottom bracket, said bottom end of said down tube and said bottom end of said seat tube and said front ends of both said chainstay tubes are interconnected, and said two rear fork ends, said rear ends of both said chainstay tubes and said bottom ends of said seatstay tubes are interconnected, wherein said head tube is at a ground angle of between 60° to 80° and said seat tube is at a ground angle of between 58° and 85° when the appropriate front fork and wheels are attached and rest on the ground, and wherein the mass of the frame without fork or other equipment is less than 5 pounds, the improvement wherein each of said top tube, down tube, seat tube, chainstay tubes and seatstay tubes is of a diameter and wall thickness such that said frame has a torsional rigidity between said head tube and said bottom bracket of at least 67 pounds$_{force}$ feet per degree of deflection with a torque being applied to the bottom bracket along an axis normal to the axis of said seat tube and normal to the axis of said bottom bracket with said head tube clamped immovably, and wherein at least one of said chainstay tubes has a relative bending yield strength represented as the outer diameter cubed minus the inner diameter cubed all times the yield strength of the tube material of at least about 14,082.486 pounds$_{force}$ inches.

8. In a bicycle having one wheel of greater than 25 inches in diameter and a frame of the type including a tubular top tube having front and rear ends, a tubular seat tube having top and bottom ends, a tubular head tube, a tubular down tube having top and bottom ends, a pair of chainstay tubes having front and rear ends, two seatstay tubes having top and bottom ends, a bottom bracket and two rear fork ends, wherein said top end of said down tube, said head tube and said front end of said top tube are interconnected, said top ends of both said seatstay tubes, said top end of said seat tube and said rear end of said top tube are interconnected, said bottom bracket, said bottom end of said down tube and said bottom end of said seat tube and said front ends of both said chainstay tubes are interconnected, and said two rear fork ends, said rear ends of both said chainstay tubes and said bottom ends of said seatstay tubes are interconnected, wherein said head tube is at a ground angle of between 60° to 80° and said seat tube is at a ground angle of between 58° and 85° when the appropriate front fork and wheels are attached and rest on the ground, and wherein the mass of the frame without fork or other equipment is less than 5 pounds, the improvement wherein each of said top tube, down tube, seat tube, chainstay tubes and seatstay tubes is of a diameter and wall thickness such that said frame has a lateral bending rigidity of at least 120 pounds$_{force}$ per inch of deflection measured at said rear fork ends of said bicycle frame with an axle installed, with said head tube clamped immovably in a horizontal position, and with said bottom bracket supported but not otherwise restrained, a force being applied and deflection measured in a direction normal to the plane of the bicycle frame and along the axis of the rear axle, and wherein at least one of said chainstay tubes has a relative bending fatigue strength represented as the outer diameter cubed minus the inner diameter cubed all times the fatigue strength of the tube material of at least about 4928.87 pounds$_{force}$ inches.

9. In a bicycle having one wheel of greater than 25 inches in diameter and a frame of the type including a tubular top tube having front and rear ends, a tubular seat tube having top and bottom ends, a tubular head tube, a tubular down tube having top and bottom ends, a pair of chainstay tubes having front and rear ends, two seatstay tubes having top and bottom ends, a bottom bracket and two rear fork ends, wherein said top end of said down tube, said head tube and said front end of said top tube are interconnected, said top ends of both said seatstay tubes, said top end of said seat tube and said rear end of said top tube are interconnected, said bottom bracket, said bottom end of said down tube and said bottom end of said seat tube and said front ends of both said chainstay tubes are interconnected, and said two rear fork ends, said rear ends of said chainstay tubes and said bottom ends of said seatstay tubes are interconnected, wherein said head tube is at a ground angle of between 60° to 80° and said seat tube is at a ground angle of between 58° and 85° when the appropriate front fork and wheels are attached and rest on the ground, and wherein the mass of the frame without fork or other equipment is less than 5 pounds, the improvement wherein each of said top tube, down tube, seat tube, chainstay tubes and seatstay tubes is of a diameter and wall thickness such that said frame has a lateral bending rigidity of at least 120 pounds$_{force}$ per inch of deflection measured at said rear fork ends of the bicycle frame with an axle installed, with said head tube clamped immovably in a horizontal position and with said bottom bracket supported but not otherwise restrained, a force being applied and deflection measured in a direction normal to the plane of the bicycle frame and along the axis of the rear axle, and wherein said down tube has a relative bending yield strength represented as the outer diameter cubed minus the inner diameter cubed all times the yield strength of the tube material of at least about 29,419.4 pounds$_{force}$ inches.

10. In a bicycle having one wheel of greater than 25 inches in diameter and a frame of the type including a tubular top tube having front and rear ends, a tubular seat tube having top and bottom ends, a tubular head tube, a tubular down tube having top and bottom ends, a pair of chainstay tubes having front and rear ends, two seatstay tubes having top and bottom ends, a bottom bracket and two rear fork ends, wherein said top end of said down tube, said head tube and said front end of said top tube are interconnected, said top ends of both said seatstay tubes, said top end of said seat tube and said rear end of said top tube are interconnected, said bottom bracket, said bottom end of said down tube and said bottom end of said seat tube and said front ends of both said chainstay tubes are interconnected, and said two rear fork ends, said rear ends of both said chainstay tubes and said bottom ends of said seatstay tubes are interconnected, wherein said head tube is at a ground angle of between 60° to 80° and said seat tube is at a ground angle of between 58° and 85° when the appropriate front fork and wheels are attached and rest on the ground, and wherein the mass of the frame without fork or other equipment is less than 5 pounds, the improvement wherein each of said top tube, down tube, seat tube, chainstay tubes and seatstay tubes is of a diameter and wall thickness such that said frame has a lateral bending rigidity of at least 120 pounds$_{force}$ per inch of deflection measured at said rear fork ends of said bicycle frame with an axle installed, with said head tube clamped immovably in a horizontal position and with said bottom brackets supported but not otherwise restrained, a force being applied and deflection measured in a direction normal to the plane of the bicycle frame and along the axis of the rear axle, and wherein at least one of said chainstay tubes has a relative bending yield strength represented as the outer diameter cubed minus the inner diameter cubed all times the yield strength of the tube material of at least about 14,082.486 pounds$_{force}$ inches.

11. In a bicycle having one wheel of greater than 25 inches in diameter and a frame of the type including a tubular top tube having front and rear ends, a tubular seat tube having top and bottom ends, a tubular head tube, a tubular down tube having top and bottom ends, a pair of chainstay tubes having front and rear ends, two seatstay tubes having top and bottom ends, a bottom bracket and two rear fork ends, wherein said top end of said down tube, said head tube and said front end of said top tube are interconnected, said top ends of both said seatstay tubes, said top end of said seat tube and said rear end of said top tube are interconnected, said bottom bracket, said bottom end of said down tube and said bottom end of said seat tube and said front ends of both said chainstay tubes are interconnected, said two rear fork ends, said rear ends of both said chainstay tubes and said bottom ends of both said seatstay tubes are interconnected, wherein said head tube is at a ground angle of between 60° to 80°, and said seat tube is at a ground angle of between 58° and 85° when the appropriate front fork and wheels are attached and rest on the ground, and wherein the mass of the frame without fork or other equipment is less than 5 pounds, the improvement wherein each of said top tube, down tube, seat tube, chainstay tubes and seatstay tubes is of a diameter and wall thickness such that said frame has a torsional rigidity between said head tube and said bottom bracket of at least 67 pounds$_{force}$ feet per degree of deflection with a torque being applied to said bottom bracket along an axis normal to the axis of said seat tube and normal to the axis of said bottom bracket with said head tube being clamped immovably, and a lateral bending rigidity of at least 120 pounds$_{force}$ per inch of deflection measured at said rear fork ends of said bicycle frame with an axle installed, with said head tube clamped immovably in a horizontal position and with said bottom bracket supported but not otherwise restrained, a force being applied and deflection measured in a direction normal to the plane of the bicycle frame and along the axis of the rear axle, and wherein said down tube has a relative bending rigidity represented as the outer diameter to the fourth power minus the inner diameter to the fourth power all times the modulus of elasticity of the tube material of at least about 14,146,903 pounds$_{force}$ inches squared and a relative torsional rigidity about its axis represented as the outer diameter to the fourth power minus the inner diameter to the fourth power all times the modulus of rigidity of the tube material of at least 5,375,823.2 pounds$_{force}$ inches squared.

12. In a bicycle having one wheel of greater than 25 inches in diameter and a frame of the type including a tubular top tube having front and rear ends, a tubular seat tube having top and bottom ends, a tubular head tube, a tubular down tube having top and bottom ends, a pair of chainstay tubes having front and rear ends, two seatstay tubes having top and bottom ends, a bottom bracket and two rear fork ends, wherein said top end of said down tube, said head tube and said front end of said top tube are interconnected, said top ends of both said seatstay tubes, said top end of said seat tube and said rear end of said top tube are interconnected, said bottom bracket, said bottom end of said down tube and said bottom end of said seat tube and said front ends of both said chainstay tubes are interconnected, said two rear fork ends, said rear ends of both said chainstay tubes and said bottom ends of both said seatstay tubes are interconnected, wherein said head tube is at a ground angle of between 60° to 80°, and said seat tube is at a ground angle of between 58° and 85° when the appropriate front fork and wheels are attached and rest on the ground, and wherein the mass of the frame without fork or other equipment is less than 5 pounds, the improvement wherein each of said top tube, down tube, seat tube, chainstay tubes and seatstay tubes is of a diameter and wall thickness such that said frame has a torsional rigidity between said head tube and said bottom bracket of at least 67 pounds$_{force}$ feet per degree of deflection with a torque being applied to said bottom bracket along an axis normal to the axis of said seat tube and normal to the axis of said bottom bracket with said head tube being clamped immovably, and a lateral bending rigidity of at least 120 pounds$_{force}$ per inch of deflection measured at said rear fork ends of said bicycle frame with an axle installed, with said head tube clamped immovably in a horizontal position and with said bottom bracket supported but not otherwise restrained, a force being applied and deflection measured in a direction normal to the plane of the bicycle frame and along the axis of the rear axle, and wherein said top tube has a relative bending rigidity represented as the outer diameter to the fourth power minus the inner diameter to the fourth power all times the modulus of elasticity of the tube material of at least about 12,428,050 pounds$_{force}$ inches squared.

* * * * *